H. SCHUMACHER.
STEERING GEAR FOR VEHICLES.
APPLICATION FILED FEB. 3, 1913.
1,117,451.
Patented Nov. 17, 1914.
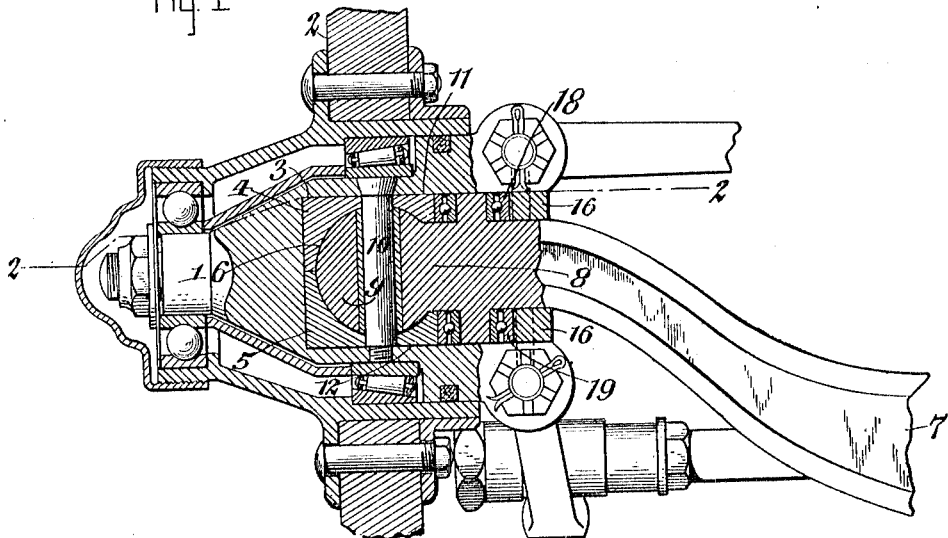
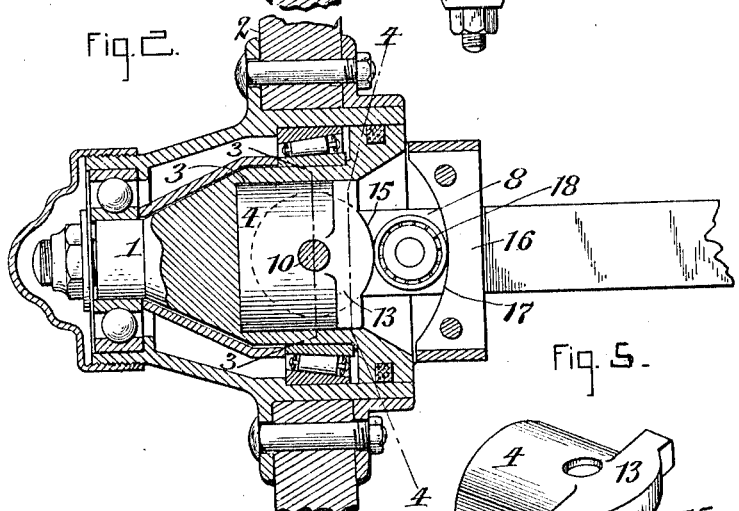
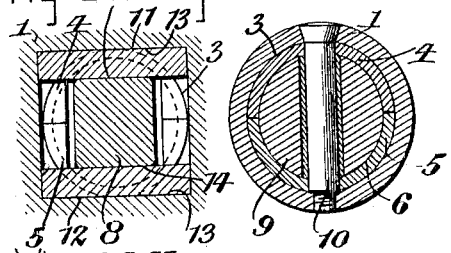
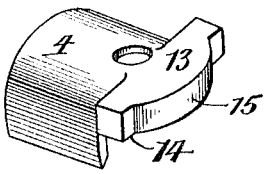
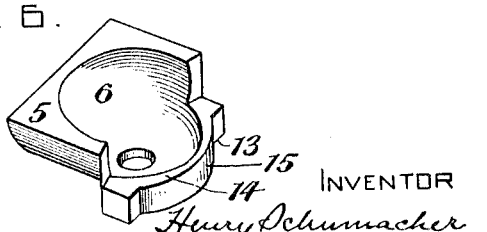
WITNESSES:-
Walter P. Geyer.
W. Ray Taylor.
INVENTOR
Henry Schumacher
by Geyer & Pohl
ATTORNEYS.

UNITED STATES PATENT OFFICE.

HENRY SCHUMACHER, OF BUFFALO, NEW YORK.

STEERING-GEAR FOR VEHICLES.

1,117,451.      Specification of Letters Patent.     Patented Nov. 17, 1914.

Application filed February 3, 1913. Serial No. 745,770.

*To all whom it may concern:*

Be it known that I, HENRY SCHUMACHER, a citizen of the United States, residing at Buffalo, in the county of Erie and State of New York, have invented new and useful Improvements in Steering-Gears for Vehicles, of which the following is a specification.

This invention relates to that type of steering gears for automobiles or similar vehicles in which the steering arms are pivotally connected with the steering axle by means of ball and socket joints arranged within the steering arms and vertically in line with the tread of the steering wheels.

It is the object of this invention to provide a steering gear of this character which can be manufactured at low cost, which produces a firm and reliable joint of ample area between the axle and the axle arm which is sufficiently strong to resist the strains to which the same is subjected and which is not liable to wear unduly.

In the accompanying drawings: Figure 1 is a vertical longitudinal section of my improved steering gear applied to the axle and axle arm adjacent to one of the wheels of the steering mechanism. Fig. 2 is a horizontal section thereof in line 2—2, Fig. 1. Figs. 3 and 4 are fragmentary vertical transverse sections taken in the correspondingly numbered lines in Fig. 2. Figs. 5 and 6 are detached perspective views of the two parts of the divided bushing forming the bearing of my improved steering gear.

Similar characters of reference indicate corresponding parts throughout the several views.

1 represents one of the axle arms of the steering gear upon the periphery of which the adjacent steering wheel 2 is mounted for vertical rotation by any suitable means. Within the inner part of this axle arm the same is provided with a socket 3 which is preferably of cylindrical form and arranged substantially horizontal and opens toward the inner end of the axle arm. Within this socket is arranged the upper and lower sections 4, 5 of a bushing the periphery of which is preferably of cylindrical form and engages snugly with the bore of the socket in the axle arm, its inner flat end bearing against the corresponding flat bottom of the socket. On the interior of the bushing the same is provided with a ball-shaped or spherical internal bearing 6 which opens through the outer end of the bushing and has a superficial area more than half of a sphere. The division between the upper and lower sections of the bushing is arranged horizontally and extends lengthwise through the center of its spherical bearing.

7 represents an axle which is provided at its end with a shank 8 terminating in a ball or spherical knuckle 9. The latter is journaled in the spherical bearing of the bushing and the shank extends through the open side of this bearing. The axle, axle arm and the bushing are pivotally connected with each other so as to permit the axle arm to turn horizontally relatively to the axle, this being preferably accomplished by means of a vertical pivot pin 10 extending through coinciding openings formed in the upper and lower parts of the axle arm, the upper and lower sections of the bushing, and the spherical knuckle of the axle arm in line with the center or axis of the spherical knuckle and bearing.

At the outer end of the cylindrical socket of the axle arm the same is provided on its upper side with a flat horizontal bearing face 11 and on its lower side with a corresponding flat horizontal face 12. At the outer end of each bushing section adjacent to the cylindrical periphery thereof the same is provided with an outer flat horizontal face 13 which is adapted to engage with one of the flat outer horizontal faces of the axle arm and on the inner side of each of these bushing sections the same is provided adjacent to the outer end of the spherical socket thereof with an inner flat horizontal face 14. The opposing inner flat faces 14 of the two bushing sections engage respectively with the upper and lower horizontal flat faces on the shank of the axle and assist in guiding the axle arm as the same turns horizontally relatively to the axle.

By forming the bearing for the knuckle of the axle in a bushing which is separate from the axle arm and dividing the bushing lengthwise through the bearing it is possible to produce a perfect joint between the axle arm and axle at comparatively low cost inasmuch as the socket in the axle arm can be bored easily and the two sections of the bushing can be made and fitted accurately to the ball of the axle before inserting these bushing sections in the socket of the axle arm. Furthermore, by making the bushing in sections and separate from the axle arm it is possible to provide a bearing contact between the bushing and the ball of the axle which is more than half of the spherical area of the ball and socket, thereby increasing the bearing surface, distributing the wear over a greater area and increasing the strength of the joint between the axle arm and axle.

In order to sustain the axle arm and the wheel against tipping vertically in a vertical plane transversely of the vehicle, means are provided which are preferably constructed as follows: 15 represents a convex track or guideway arranged on the outer end of each bushing section concentrically with the axis of the pivot pin 10 and the ball and socket joint between the axle arm and axle. Adjacent to the outer end of each bushing section is arranged a transverse bar 16 which is secured to the adjacent outer part of the axle arm and provided on its inner side with a concave track or guideway 17 which faces the convex track of the respective bushing section and is also concentric with the axis of the pivot pin and the ball and socket joint. On its upper and lower sides the shank of the axle is provided with upper and lower thrust rollers 18, 19 each of which is pivotally mounted on this shank in any suitable manner and engages its opposite sides with the convex track of one bushing section and the companion concave track of the companion supporting bar. As the axle arm is turned horizontally on the axle the upper and lower pairs of convex and concave tracks move along the upper and lower thrust rollers so that no appreciable resistance is offered to the movement of the axle arm in this direction but if the wheel and axle arm are subjected to any strains which tend to tip the same vertically and in a direction transversely to the vehicle such movement is resisted by engagement of the concave and convex tracks of the axle arm with the thrust rollers of the axle. This steering gear for vehicles is very durable and efficient in operation, the same can be produced economically and when the joint between the axle and axle arm becomes worn out the worn parts can be replaced at small cost.

I claim as my invention:

1. A steering axle for vehicles comprising an axle arm provided in its inner part with a cylindrical socket, a bushing having a cylindrical exterior which engages the bore of the socket and a spherical internal bearing divided lengthwise into upper and lower sections through said bearing and provided at its outer end with a convex track curved concentrically with the axis of said bearing, an axle having a spherical knuckle journaled in said bearing, and a roller mounted on said axle and engaging with said track.

2. A steering axle for vehicles comprising an axle arm provided in its inner part with a cylindrical socket, a bushing having a cylindrical exterior which engages the bore of the socket and a spherical internal bearing divided lengthwise into upper and lower sections through said bearing and each section provided at its outer end with a track curved concentrically with the axis of said bearing, an axle having a spherical knuckle journaled in said bearing, and rollers mounted on the upper and lower sides of said axle and engaging with the tracks of said upper and lower bushing sections.

3. A steering gear for vehicles comprising an axle arm provided at its inner end with a cylindrical socket, a bushing having a cylindrical exterior engaging with the bore of said socket and a spherical internal bearing which opens at its outer end and is divided centrally lengthwise through its bearing so as to form upper and lower sections and each section being provided at its outer end with a convex track which is curved concentrically with the bearing, concave tracks mounted on the axle arm and each opposed to one of the convex tracks, and rollers mounted on the upper and lower sides of the axle and each engaging its opposite sides with one of the convex tracks and its companion concave track.

4. A steering gear for vehicles comprising an axle arm provided in its inner part with a cylindrical socket and at the outer end of said socket with upper and lower flat horizontal faces, a bushing having a cylindrical exterior engaging with the bore of the socket and provided with an internal spherical socket, said bushing being divided centrally lengthwise of its bearing into upper and lower sections each of which is provided at the outer end of its periphery with a flat outer horizontal face and at the outer end of its spherical face with a flat inner horizontal face, the flat outer face of each bushing section engaging with one of the flat faces of said axle arm, and an axle engaging with the inner flat faces of said bushing sections and having a spherical knuckle journaled in said bearing.

Witness my hand this 30th day of November, 1912.

HENRY SCHUMACHER.

Witnesses:
L. BRADLEY DORR,
THEO. STEEG.